United States Patent [19]

Takasaki

[11] Patent Number: 5,245,240
[45] Date of Patent: Sep. 14, 1993

[54] ARMATURE HAVING A FLAT DISK TYPE COMMUTATOR

[76] Inventor: Junichi Takasaki, Hishimachi-Kurokawa 3413-6, Kiryu-shi, Gunma, Japan

[21] Appl. No.: 914,889

[22] Filed: Jul. 16, 1992

[30] Foreign Application Priority Data

Jul. 17, 1991 [JP] Japan .................. 3-202562

[51] Int. Cl.[5] .......................................... H02K 13/04
[52] U.S. Cl. ..................................... 310/237; 310/42; 310/235; 219/56.1; 219/56.22
[58] Field of Search ............... 310/42, 43, 233, 235, 310/234, 45, 195, 237, 208; 29/597; 219/56.1, 56.22; 417/366

[56] References Cited

U.S. PATENT DOCUMENTS

| | | | |
|---|---|---|---|
| 1,901,955 | 3/1933 | Giamo | 310/233 UX |
| 3,486,056 | 12/1969 | Vuillemot | 310/233 UX |
| 3,705,997 | 7/1971 | Bauerle et al. | |
| 3,781,981 | 1/1974 | Miura | 29/597 |
| 3,812,576 | 5/1974 | Yamaguchi | 310/237 |
| 3,826,894 | 7/1974 | Melvin | |
| 4,396,358 | 8/1983 | De Concini | 29/597 |
| 4,521,710 | 6/1985 | Mabuchi | 310/234 |
| 4,835,430 | 5/1989 | Siu | 310/234 |
| 5,012,149 | 4/1991 | Strobl | 310/234 |
| 5,122,975 | 6/1992 | Luchiani | 310/234 |
| 5,155,405 | 10/1992 | D'Aniello | 310/237 |
| 5,157,299 | 10/1992 | Gerlack | 310/237 |

FOREIGN PATENT DOCUMENTS

| | | |
|---|---|---|
| 2310011 | 4/1976 | France . |
| 58-207840 | 12/1983 | Japan . |
| 60-135053 | 9/1985 | Japan . |
| 62-132670 | 8/1987 | Japan . |

*Primary Examiner*—R. Skudy

[57] ABSTRACT

In an armature wherein a plurality of base metals 15 electrically insulated from one another are solidly secured to the surface of a boss portion 10, carbon protective members 18 are jointed to the surfaces of the base metals 15, respectively, through a solder layer 19 and coil ends 5 of an armature core are jointed to the risers, an auxiliary electrode portion 17 is formed integrally with the riser 12 on each of the base metals 15.

8 Claims, 2 Drawing Sheets

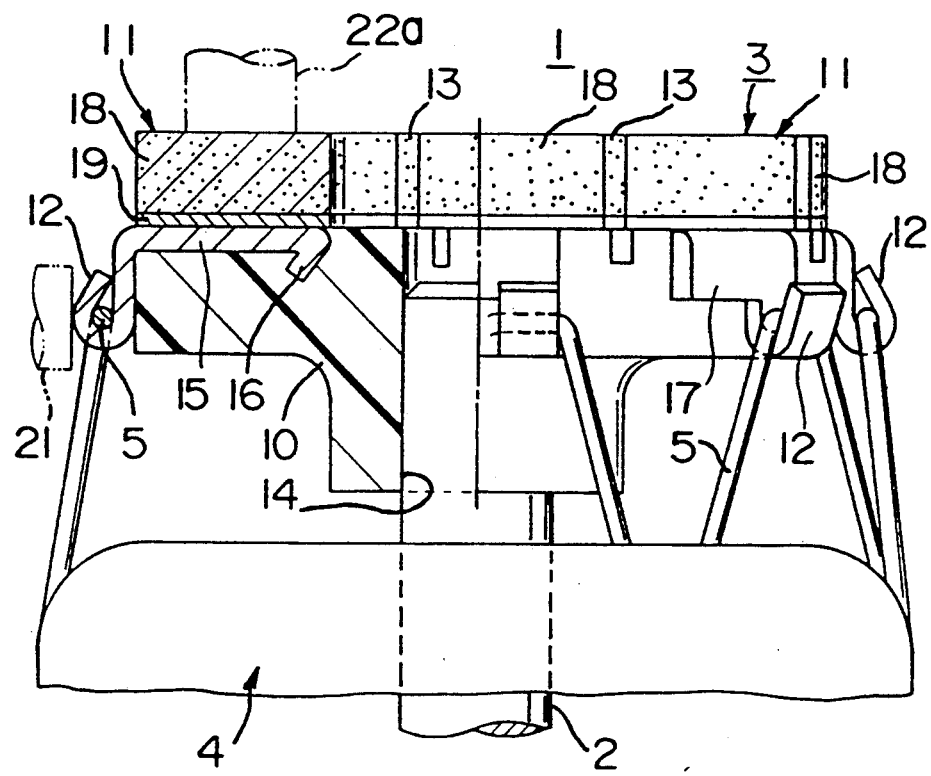

ARMATURE HAVING A FLAT DISK TYPE COMMUTATOR

BACKGROUND OF THE INVENTION

1. Field of the Invention

This invention relates to an armature used in a small-sized motor, and more particularly to improvements in the technique of fusing treatment of a riser and a coil in order to electrically connect a coil to a commutator segment.

2. Related Art Statement

As a commutator provided with a countermeasure for gasohol, there is one in which a protective member made of a silver-nickel alloy is clad on a surface of a copper base of the segment, at least at portion which contacts brushes (refer to Japanese Utility Model Application Laid-Open Nos. 60-135053 and 62-132670, for example).

Now, if silver is used in the protective member, then the cost is increased, so that, as described in Japanese Patent Application Laid-Open No. 58-207840, there is proposed a carbon commutator wherein a copper segment is solidly secured to a boss portion formed integrally with synthetic resin and carbon plated by copper is soldered onto the segment.

With the above-described commutator, in applying the fusing treatment, in which a coil of an armature core is guided around a riser formed integrally with the copper segment, such a practice is commonly used that the riser is made to be a main electrode portion and the carbon jointed to the segment is made to be an auxiliary electrode portion, electric current is supplied therethrough to peel off an insulating film of the coil and to weld the coil to the riser (Refer to the hypothetical lines in FIG. 2).

However, in the fusing treatment in the above-described carbon commutator, a solder layer for bonding the carbon to the copper segment is included in the current passage route, whereby, when the time of applying current is lengthened, there is a possibility that the solder layer is melted so that the carbon comes off the copper segment.

SUMMARY OF THE INVENTION

An object of the present invention is to provide an armature, in which the fusing treatment of the coil guided around the risers can be applied even if the carbon protective member is excluded from the current passage route.

The armature according to the present invention is characterized in that, in an armature having a flat disk type commutator, in which a plurality of electrically conductive base metals which are insulated from one another are solidly secured to a boss portion formed integrally with synthetic resin; protective members are respectively bonded to the surfaces of the base metals by use of an electrically conductive and hot-melt bonding material; a riser is projected from each of the base metals; coils of an armature core are guided around the risers and welded thereto by the fusing treatment respectively; and the riser as being the main electrode portion, with which a main electrode comes into contact, and the auxiliary electrode portion, with which an auxiliary electrode comes into contact during the fusing treatment, are formed integrally on each of the base metals.

In the above-described armature according to the present invention, current is passed between the riser and the auxiliary electrode portion of the base metal to apply the fusing treatment of the coil guided around the riser, so that the protective member can be excluded from the current passage route. Accordingly, the protective member can be prevented from being peeled off the base metal due to the Joule heat by the current passage during the fusing treatment.

BRIEF DESCRIPTION OF THE DRAWINGS

The above and other objects and features of the present invention will become more apparent when referred to the following descriptions given in conjunction with the accompanying drawings, wherein like reference numerals denote like elements, and in which:

FIG. 2 is a partially cutaway front view of FIG. 1.

DETAILED DESCRIPTION OF THE PREFERRED EMBODIMENTS

Figure 1:
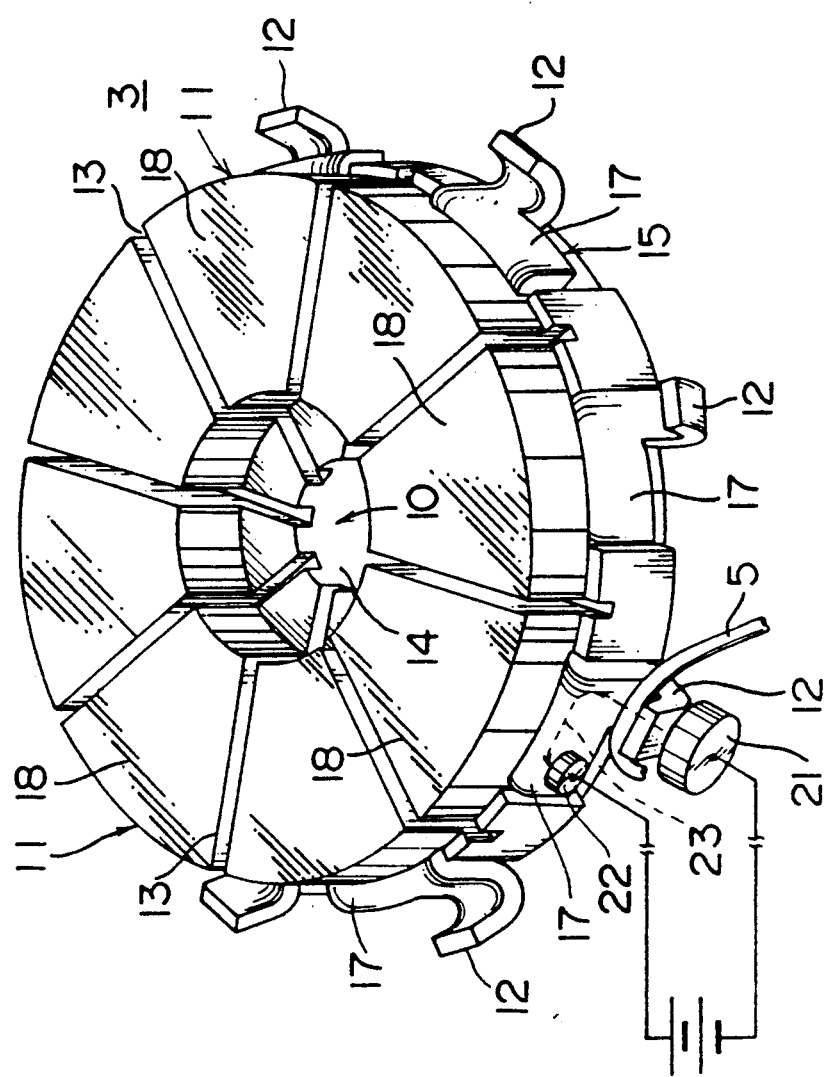
FIG. 1 is a partially omitted perspective view showing the essential portions of the present invention.

In this embodiment, the armature according to the present invention is the one used in a motor for driving a fuel pump for pressure-delivering gasohol as a fuel. This armature 1 comprises an armature shaft 2 substantially constituting a motor shaft, a commutator 3 solidly secured to the armature shaft 2, and an armature core 4 solidly secured to the armature shaft 2 in a position adjacent to the commutator 3.

The commutator 3 has a flat commutator construction and includes a boss portion 10 made of insulating synthetic resin and having a substantially disk shape of a thick wall a plurality of sets of segments 11 each formed of a substantially segmental shape and arranged radially and substantially equidistantly on the surface of the boss portion 10, risers 12 formed integrally on the segments 11, respectively, and slits 13 for bringing the adjoining segments 11 into the state where the segments are electrically insulated from one another. A shaft mounting opening 14 is opened in the boss portion 10 provided concentrically therewith. An end portion of the armature shaft 2 is inserted into the shaft mounting opening 14 and the commutator 3 is fixed to the armature shaft 2. In this state, the commutator 3 is adjacent to the armature core 4.

Each of the segments 11 includes a base metal 15 formed of copper or a copper alloy, a protective member 18 obtained by baking carbon, and a solder layer 19 solidly securing the protective member 18 to the base metal 15. The base metal 15 is provided on an end face of the boss portion 10 on the side opposite to the armature core 4 (hereinafter referred to as the "top surface") and insert-molded with the boss portion 10. A pawl 16 projectedly provided and formed integrally on the base metal 15 is embedded in the boss portion 10, whereby the base metal 15 is securely fixed to the boss portion 10.

In this embodiment, an auxiliary electrode portion 17 is formed integrally on the base metal 15 in connection thereto and this auxiliary electrode portion 17 is provided on the circular outer peripheral surface of the boss portion 10 and fixed thereto. The riser 12 is provided integrally at one side of this auxiliary electrode portion 17 in connection thereto. The auxiliary electrode portion 17 and the riser 12 are formed integrally on the base metal 15, whereby the both members are electrically connected to each other. Furthermore, the riser 12 and the auxiliary electrode portion 17 are obtained by bending the base metal 15 through press molding, so that both the riser and auxiliary electrode portion have the advantage of thin shapes.

The riser 12 is formed to provide a substantially U-shape in section, and a coil end 5 of the armature core 4 is guided around a bent-back portion of the U-shape, and thereafter, welded by the fusing treatment to be described hereunder, whereby the coil end 5 is electrically connected to the riser 12.

A protective member 18 obtained by baking carbon is solidly secured onto the top surface of the base metal 15 by a solder layer 19 formed of a soldering material being a conductive and hot-melt bonding material, whereby the protective member 18 is mechanically and also electrically connected to the base metal 15. The top surface of the protective member 18 slidably contacts brushes, not shown, whereby current is passed to the armature core 4 through the solder layer 19, base metal 15, the riser 12 and the coil end 5.

The respective segments 11 are electrically separated from one another by the slits 13 cuttingly provided between the adjoining segments. However, such an arrangement may be adopted that, in advance, a plurality of segments 11 each formed to provide a segmental shape are arranged circularly, interposing the slits therebetween, and insert-molded with the boss portion 10.

The method of manufacturing the armature having the above-described arrangement as being one embodiment of the present invention and the action thereof will hereunder be described.

First, the commutator 3 having the above-described arrangement is coupled onto the armature shaft 2, and the armature core 4 is solidly secured to the armature shaft 2 at a position adjacent to the commutator 3.

Thereafter, the respective coil ends 5 of the armature core 4 are guided around the bent-back portions of the risers 12.

Subsequently, the fusing treatment is applied to the risers 12. That is, as shown in FIG. 1, one electrode 21 (hereinafter referred to as "main electrode") for the fusing treatment is brought into contact with the riser 12, and the other electrode 22 (hereinafter referred to as an "auxiliary electrode") is brought into contact with the auxiliary electrode portion 17. In this state, when current is passed between the main electrode 21 and the auxiliary electrode 22, current is passed through a current passage route 23 taking a course of the main electrode 21—riser 12—auxiliary electrode portion 17—auxiliary electrode 22. At this time, when the main electrode 21 contacted with the riser 12 is pushed toward the boss portion 10, the riser 12 is collapsed by this pushing force and pressure is applied to the coil end 5, whereby an insulating coating (enamel coating) of the coil end 5 is peeled off due to the Joule heat caused by the current passage and the pushing force. As a result, the coil end 5 is welded to the riser 12 and the coil end 5 becomes electrically connected to the riser 12.

In this embodiment, when the coil end 5 is welded to the riser 12 by the fusing treatment, the protective member 18 and solder layer 19 are excluded from the current passage route 23. Hence, such a failure that the solder layer 19 is melted by the Joule heat caused by the current passage and the protective member 18 is dropped from the base metal 15 can be previously prevented from occurring.

On the contrary, as indicated by the hypothetical lines in FIG. 2, when the main electrode 21 is brought into contact with the riser 12 and the auxiliary electrode 22a is brought into contact with the protective member 18, the current passage route takes a course of the main electrode 21—riser 12—base metal 15—solder layer 19—auxiliary electrode 22a, whereby the solder layer 19 is included in the current passage route, so that such a failure is occurred that the solder layer 19 is melted by the Joule heat caused by the current passage and the protective member 18 is dropped from the base metal 15.

Incidentally, the present invention should not be limited to the above embodiment and, needless to say, the present invention can be variously modified within the scope of the invention.

For example, the protective member should not be necessarily formed of carbon, and the material for bonding the protective member to the base metal should not be limited to the soldering material. The present invention is generally applicable to the armatures in which the protective member is bonded to the base metal by use of the hot-melt conductive bonding material.

As has been described hereinabove, according to the present invention, when the fusing treatment is applied to the coil guided around with the risers, the riser is made to be the main electrode portion, the portion of the base metal is made to be the auxiliary electrode portion and current is passed through the both portions, and the solder layer for bonding the protective member to the base metal is excluded from the current passage route, so that the failure characterized in that the solder layer is melted by the Joule heat caused by the fusing treatment and the protective member is dropped off the base metal can be prevented from occurring.

What is claimed is:

1. An armature having a flat disk type commutator, comprising:

a plurality of segments each of which includes an electrically conductive base metal having an upper and lower substantially flat surface and extending radially from a central axis;

each of said segments being circumaxially disposed about said central axis and electrically insulated from one another, said electrically conductive base metal being solidly secured to a boss portion, said boss portion being formed from synthetic resin and integrally with each of said base metals, said boss portion further having a circular outer peripheral surface, said base metal further comprising a riser defining a main electrode portion and an auxiliary electrode portion, said main electrode portion and said auxiliary electrode portion being formed integrally on said base metal and each having outwardly facing surfaces, said main and auxiliary electrode portions being disposed side-by-side one another circumferentially and along said circular outer peripheral surface of said boss portion;

each of said segments further comprising a protective member bonded to the upper substantially flat surface of said base metal by means of an electrically conductive and hot-melt bonding material, said protective member having a shape and size substantially equal to the upper substantially flat surface of said base metal;

said riser forming a support and guide for welding a wire end of an armature coil thereto during a fusing treatment wherein a main electrode is brought into contact with said main electrode portion of said base metal and an auxiliary electrode is brought into contact with said auxiliary electrode portion of said base metal so that during the fusing treatment electrical current flows through the main electrode to the main electrode portion circumferentially through the base metal through the auxiliary electrode portion to the auxiliary electrode without passing through the bonding material during the fusing treatment.

2. The armature as set forth in claim 1, wherein said riser and said auxiliary electrode portion are formed by press-molding said base metal.

3. The armature as set forth in claim 1, wherein said riser and said auxiliary electrode portion are formed adjacent said circular outer peripheral surface of said boss portion and are integral with the upper and lower surface of said base metal so that the lower substantially flat surface of said base metal forming said auxiliary electrode portion is in facing relationship with said circular outer peripheral surface of said boss.

4. The armature as set forth in claim 1, wherein said base metal is copper.

5. The armature as set forth in claim 1, wherein said base metal is a copper alloy.

6. The armature as set forth in claim 3, wherein said riser is generally U-shaped for holding the wire end of said armature coil.

7. The armature as set forth in claim 1, wherein said electrically conductive and hot-melt bonding material comprises a solder layer.

8. An armature having a flat disk type commutator, comprising:
a plurality of segments each of which include an electrically conductive base metal having an upper and lower substantially flat surface and extending radially from a central axis;
each of said segments being circumaxially disposed about said central axis and electrically insulated from one another, said electrically conductive base metal being solidly secured to a boss portion, said boss portion being formed from synthetic resin and integrally with each of said base metals, said boss portion further having a circular outer peripheral surface, said base metal further including a pawl means insert—molded with said boss portion, a riser defining a main electrode portion and an auxiliary electrode portion;
each of said segments further comprising a protective member bonded to the upper substantially flat surface of said base metal by means of an electrically conductive and hot-melt bonding material, said protective member having a shape and size substantially equal to the upper substantially flat surface of said base metal;
said riser forming a support and guide for welding a wire end of an armature coil thereto during a fusing treatment wherein a main electrode is brought into contact with said main electrode portion of said base metal and an auxiliary electrode is brought into contact with said auxiliary electrode portion of said base metal so that during the fusing treatment electrical current flows through the main electrode to the main electrode portion through the base metal through the auxiliary electrode portion to the auxiliary electrode without passing through the bonding material during the fusing treatment.

* * * * *